United States Patent [19]

Moriya

[11] Patent Number: 5,051,819
[45] Date of Patent: Sep. 24, 1991

[54] COLORED IMAGE READING APPARATUS

[75] Inventor: Shigeru Moriya, Osaka, Japan

[73] Assignee: Minolta Camera Kabushiki Kaisha, Osaka, Japan

[21] Appl. No.: 260,121

[22] Filed: Oct. 20, 1988

[30] Foreign Application Priority Data

Oct. 21, 1987 [JP] Japan .................. 62-267144
Oct. 21, 1987 [JP] Japan .................. 62-267145
Oct. 21, 1987 [JP] Japan .................. 62-267146

[51] Int. Cl.$^5$ ............................. H04N 1/46
[52] U.S. Cl. ......................... 358/76; 358/75; 358/80
[58] Field of Search .............. 358/78, 75, 80, 76, 358/400, 401, 474, 452

[56] References Cited

U.S. PATENT DOCUMENTS

| | | | |
|---|---|---|---|
| 4,206,998 | 6/1980 | Tokuda | 355/77 |
| 4,661,184 | 4/1987 | Sekizawa et al. | 358/80 |
| 4,727,434 | 2/1988 | Kawamura | 358/80 |
| 4,739,397 | 4/1988 | Hayashi | 358/80 |
| 4,819,193 | 4/1989 | Imao | 358/80 |

FOREIGN PATENT DOCUMENTS 60-216670 10/1985 Japan .

Primary Examiner—Edward L. Coles, Sr.
Assistant Examiner—Jerome Grant, II.
Attorney, Agent, or Firm—Burns, Doane, Swecker & Mathis

[57] ABSTRACT

A colored image reading apparatus in which the light-intensity signals produced in response to the red, green and blue color components of the light carrying the image information picked up from a given document sheet are converted into quantity-of-ink data signals indicating the quantities of cyanic-, magenta- and yellow-colored inks to be used for the formation of colored pixels, wherein the conversion of the light-intensity signals into the quantity-of-ink data signals is effected by a conversion table into which are stored quantity-of-ink data produced through mathematic calculation involing logarithmic conversion of variable values. By virtue of such mathematic calculation effected in the conversion table, the can dispense with any hardware implementation that would otherwise be required for the logarithmic conversion of voltage signals produced by an image sensor.

13 Claims, 10 Drawing Sheets

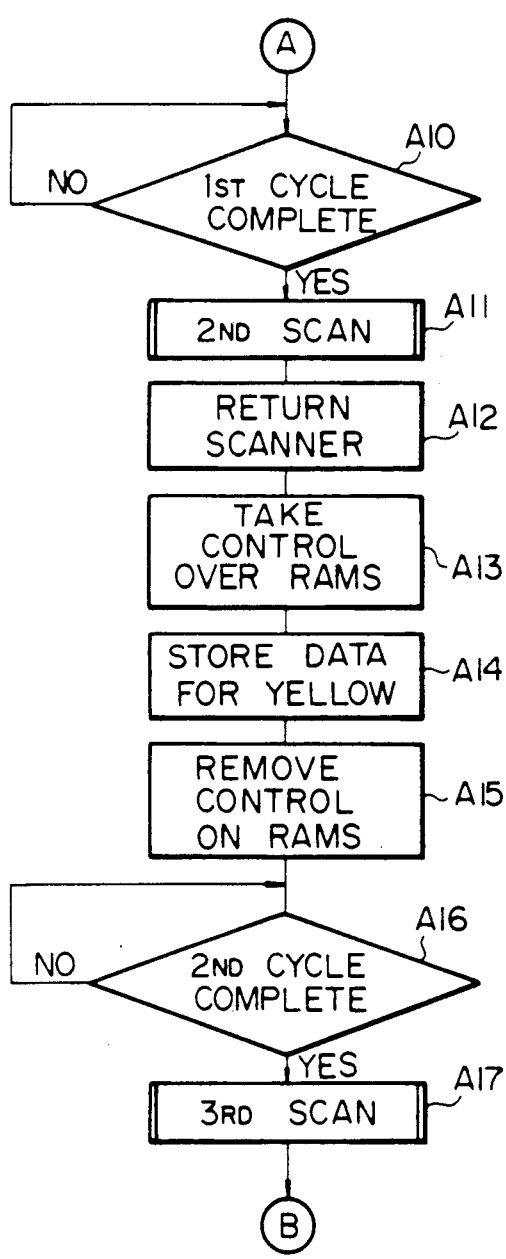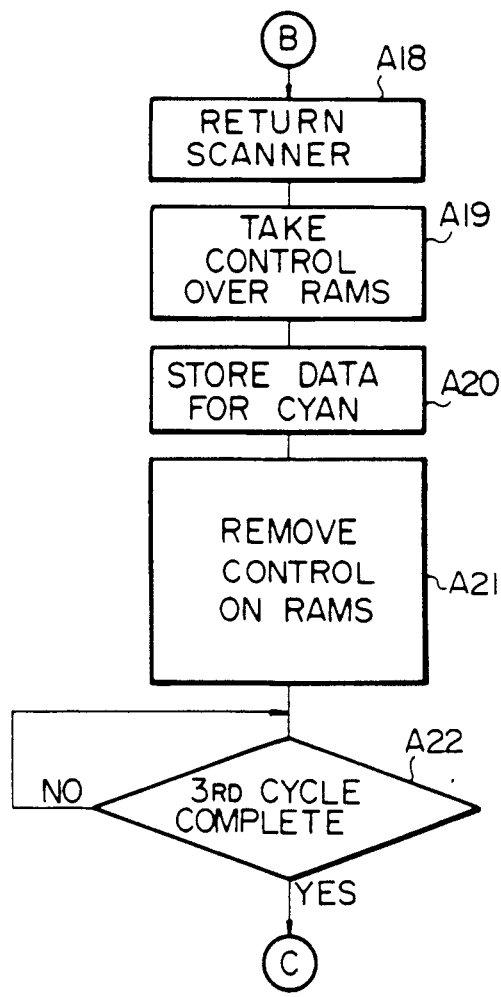

COLORED IMAGE READING APPARATUS

FIELD OF THE INVENTION

The present invention relates to a colored image reading apparatus for use in or with a digital color printer and, more particularly, to a colored image reading apparatus of the type responsive to multi-color images for producing signals for use in reproducing the original images.

DESCRIPTION OF THE PRIOR ART

FIG. 1 of the drawings shows an example of a prior-art colored image reading apparatus to which the present invention generally appertains. As shown, the colored image reading apparatus is used to read images on an original document sheet D bearing multi-colored images thereon and comprises a source of light which is typically implemented by a white-light illuminating lamp 20. The document sheet D is irradiated with the light emanating from the lamp 20 and incident on the image-bearing face of the document sheet D. The illuminating lamp 20 is driven for reciprocating movement in the directions of arrowheads a and a' by suitable drive means such as typically a reversible-motion scanner drive motor 22. The image-bearing face of the document sheet D is thus optically scanned by the light from the lamp 20 thus moved with respect to the document sheet D and the resultant information-carrying beam reflected from the document sheet D is directed to an image sensor 24 which is also held in a predetermined position with respect to the document sheet D. The image sensor 24 is typically implemented by a linear array of charge-coupled devices (CCD's) arranged in combination with color filter elements for red, green and blue.

Activated by the incident information-carrying beam, the image sensor 24 produces light-intensity signals $V_r$, $V_g$ and $V_b$ of different voltage levels representing the intensities of light of the red, green and blue components, respectively, of the light passed through the color filter elements. These voltage signals $V_r$, $V_g$ and $V_b$ are supplied sequentially to a logarithmic amplifier 26 and are thereby converted into color-density signals $V_R$, $V_G$ and $V_B$ which are representative of the respective densities of color of the red, green and blue components of the light reflected from the document sheet D. As well known in the art, a logarithmic amplifier is implemented by an operational amplifier having a feedback transistor and is operative to produce in response to an input voltage $V_{in}$ an output voltage $V_{out}$ expressed in the form $-a.\log V_{in} + b$ where a and b are fixed parameters.

The analog color-density signals $V_R$, $V_G$ and $V_B$ are fed to an analog-to-digital (A/D) converter 28 and are converted into corresponding digital color-density signals $D_R$, $D_G$ and $D_B$, respectively. The digital color-density signals $D_R$, $D_G$ and $D_B$ thus output from the analog-to-digital converter 28 are supplied to a shading generator circuit 30 which compensates for the spurious response components which may be contained in the input signals $D_R$, $D_G$ and $D_B$. Such spurious response components of the signals $D_R$, $D_G$ and $D_B$ may be created by the nonuniform background level of the detected image due to, for example, the shading of the light generated by the illuminating lamp 20 and/or the irregularities in performance characteristics of the component elements and devices forming the image sensor 24.

The corrected digital color-density signals, now denoted $D_R'$, $D_G'$ and $D_B'$, are transferred to a masking circuit 32 through which the signals $D_R'$, $D_G'$ are $D_B'$ are processed to produce signals $S_C$, $S_M$ and $S_Y$ indicative of the quantities of cyanic-, magenta- and yellow-colored inks to be used for the reproduction of the images represented by the supplied signals $D_R'$, $D_G'$ and $D_B'$, respectively. The signals $S_M$, $S_Y$ and $S_C$ thus output from the masking circuit 32 are supplied to a half-tone generator circuit 34 which produces dither-processed signals variable with the supplied digital signals $S_M$, $S_Y$ and $S_C$. The dither-processed signals are supplied to driver circuits for the ink-jet nozzles of, for example, a color printer (not shown) and are used for the control of the quantities of the cyanic-, magenta-, and yellow-colored inks to be ejected from the print head of the printer. The analog-to-digital converter 26, shading amplifier 28, masking circuit 32 and half-tone generator circuit 34 as hereinbefore described operate under the control of a microprocessor 36 (MPU), which also controls a driver circuit 38 for the scanner drive motor 22.

A prior-art colored image reading apparatus of the nature hereinbefore described has a drawback which results from the fact that the quantities of inks to be ejected from the print head are determined on the basis of the digital color-density signals $D_R$, $D_G$ and $D_B$. These digital color-density signals $D_R$, $D_G$ and $D_B$ are produced through logarithmic conversion of the original voltage signals $V_r$, $V_g$ and $V_b$ produced from the image sensor 20. The provision of the logarithmic amplifier 26 to effect such conversion results in added complexity and enlarged construction of the colored image reading apparatus as a whole.

The masking circuit 32 included in the prior-art colored image reading apparatus is typically of the type disclosed in Japanese Provisional Patent Publication (Kokai) No. 60-216670. The device therein taught uses a conversion table storing the products of multiplication of a fixed parameter predetermined for each of the colors available and the various densities of color which may be represented by each of the digital color-density signals $D_R$, $D_G$ and $D_B$. The fixed parameters used in such multiplication are selected to represent, typically, the respective printing characteristics of the cyanic-, magenta- and yellow-colored inks to be used. The data output from the conversion table respectively for the color-density signals $D_R$, $D_G$ and $D_B$ are summed up and the resultant signals are output as the signals $D_M$, $D_Y$ and $D_C$ from the masking circuit 32. A masking circuit of this type has a problem in that the conversion table which forms part of the circuit is required to have such a large capacity that can afford to store all the possible densities of color for each of the colors available. Another problem of the masking circuit results from the fact that the conversion table of the circuit is provided by a plurality of read-only memories directly connected between the preceding and subsequent stages of the masking circuit. The use of such memories is objectionable for the difficulty in modifying the multiplication parameter for the purpose of adjusting the color tones to be produced by the signals $S_M$, $S_Y$ and $S_C$ from the masking circuit 32.

SUMMARY OF THE INVENTION

Accordingly, it is an important object of the present invention to provide an improved colored image reading apparatus which will eliminate all of these problems and drawbacks which have been inherent in a known colored image reading apparatus of the described construction.

It is another important object of the present invention to provide an improved colored image reading apparatus which can dispense with any hardware implementation for logalithmic conversion of voltage signals produced by an image sensor.

It is still another important object of the present invention to provide an improved colored image reading apparatus having a masking circuit in which a conversion table is provided by small-capacity random-access memories into which are to be stored only the data indicating the quantities of the inks of different colors in response to the currently supplied light-intensity signals.

Yet, it is still another important object of the present invention to provide an improved colored image reading apparatus in which the data indicating the quantities of the inks of different colors in response to the currently supplied light-intensity signals are loaded into the random-access memories of the conversion table at reasonably controlled timings.

In accordance with a first outstanding aspect of the present invention, there is provided a colored image reading apparatus in which the light-intensity signals produced in response to the red, green and blue color components of the light carrying the image information picked up from a given document sheet are converted into quantity-of-ink data signals indicating the quantities of cyanic-, magenta- and yellow-colored inks to be used for the formation of colored pixels, wherein the conversion of the light-intensity signals into the quantity-of-ink data signals is effected by a conversion table into which are stored quantity-of-ink data produced through mathematic calculation involving logarithmic conversion of variable values. By virtue of such mathematic calculation effected in the conversion table, the can dispense with any hardware implementation that would otherwise be required for the logarithmic conversion of voltage signals produced by an image sensor.

In accordance with a second outstanding aspect of the present invention, there is provided a colored image reading apparatus in which the conversion table to convert the light-intensity signals into the quantity-of-ink data signals is composed of a set of first memories into which are to be stored only the data indicating the quantities of the inks of different colors in response to the currently supplied light-intensity signals, the data to be stored in these memories in respect of the ink of each color being fetched from a second memory. The second memory may be arranged to be exchangeable with another memory storing a modified version of the data stored in the second memory or may be selected from among a plurality of similar memories storing different versions of quantity-of-ink data.

In accordance with a third outstanding aspect of the present invention, there is provided a colored image reading apparatus in which the quantity-of-ink data stored in the second memory are loaded into the first memories on the return stroke of the scanner illuminating a document sheet to pick up image information therefrom during a cycle of scanning operation to produce a light-intensity signal for one of the colors in which images are to be printed on a record medium such as typically a sheet of paper. No extra period of time is thus required for the loading of the quantity-of-ink data from the second memory into the first memories.

In accordance with the present invention, there is provided a colored image reading apparatus for use in reproducing multi-color images with toning materials of different colors and having different properties, comprising a) a color image sensor to be driven for movement with respect to a document to read images on the document and produce light-intensity signals respectively variable with the red, green and blue components of the images, b) masking means for converting the light-intensity signals into data dictated by the properties of the toning materials with which the images are to be reproduced, the masking means comprising memory means for storing data respectively corresponding to various values of the light-sensitive signals and summing means for summing signals representative of the data output from the memory means, c) the memory means having stored therein data representative of logarithmic values of the products of multiplication of the values respectively corresponding to the light-intensity signals and predetermined parameters specific to the properties of the toning materials, the memory means being operative to output to the summing means the data representative of the logarithmic values in respect of the different colors, and e) output means for outputting signals representing the data produced by the masking means for reproducing the multi-color images.

BRIEF DESCRIPTION OF THE DRAWINGS

The features and advantages of a colored image reading apparatus according to the present invention will be more clearly appreciated from the following description taken in conjunction with the accompanying drawings in which:

FIGS. 7A to 7C are flowcharts showing an example of the routine program to be executed by the microprocessor incorporated in the masking circuit;

DESCRIPTION OF THE PREFERRED EMBODIMENTS

General Construction and Arrangement of Embodiment

Figure 1:
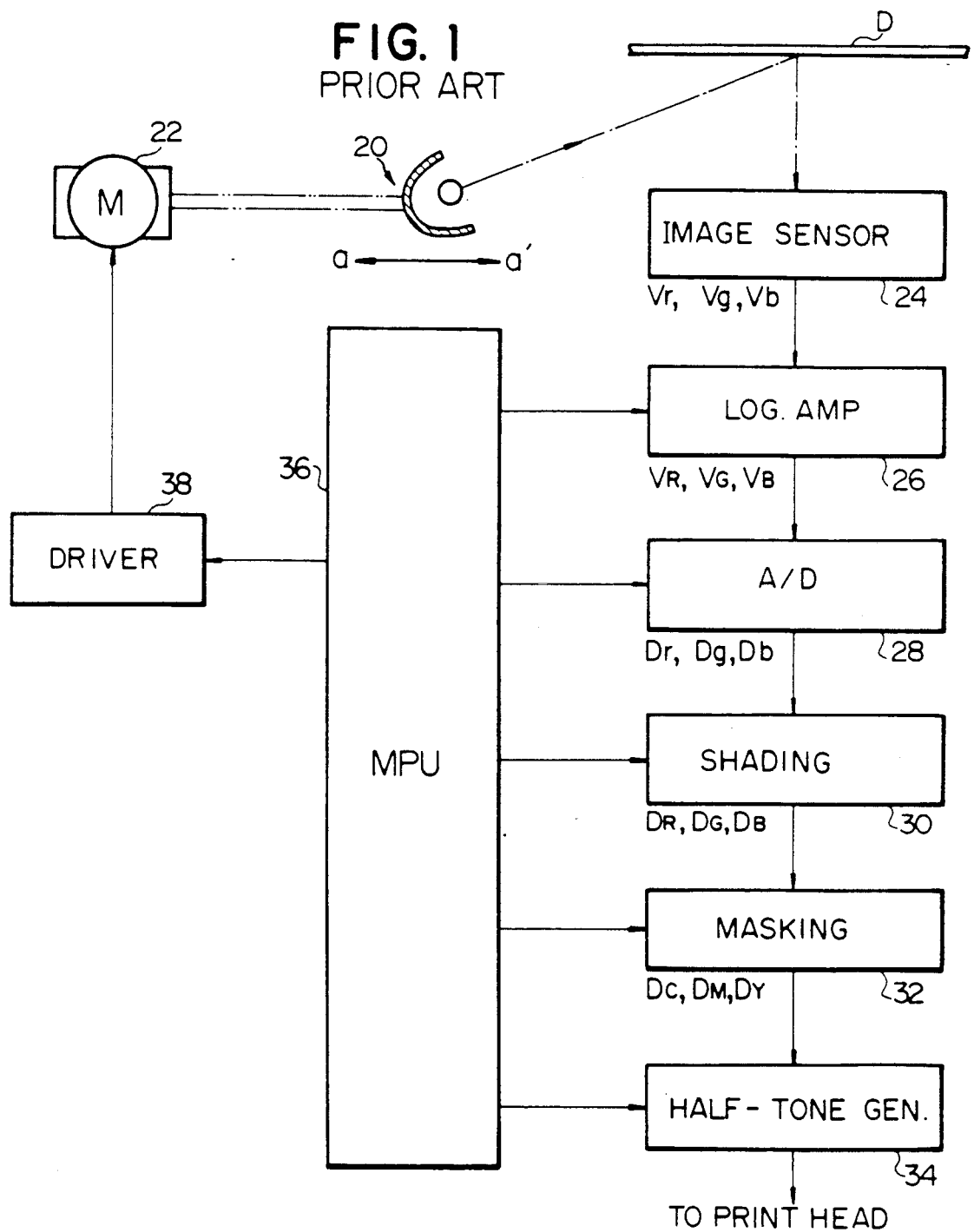
FIG. 1 is a block diagram showing an example of a prior-art colored image reading apparatus of the type to which the present invention generally appertains.
Figure 2:
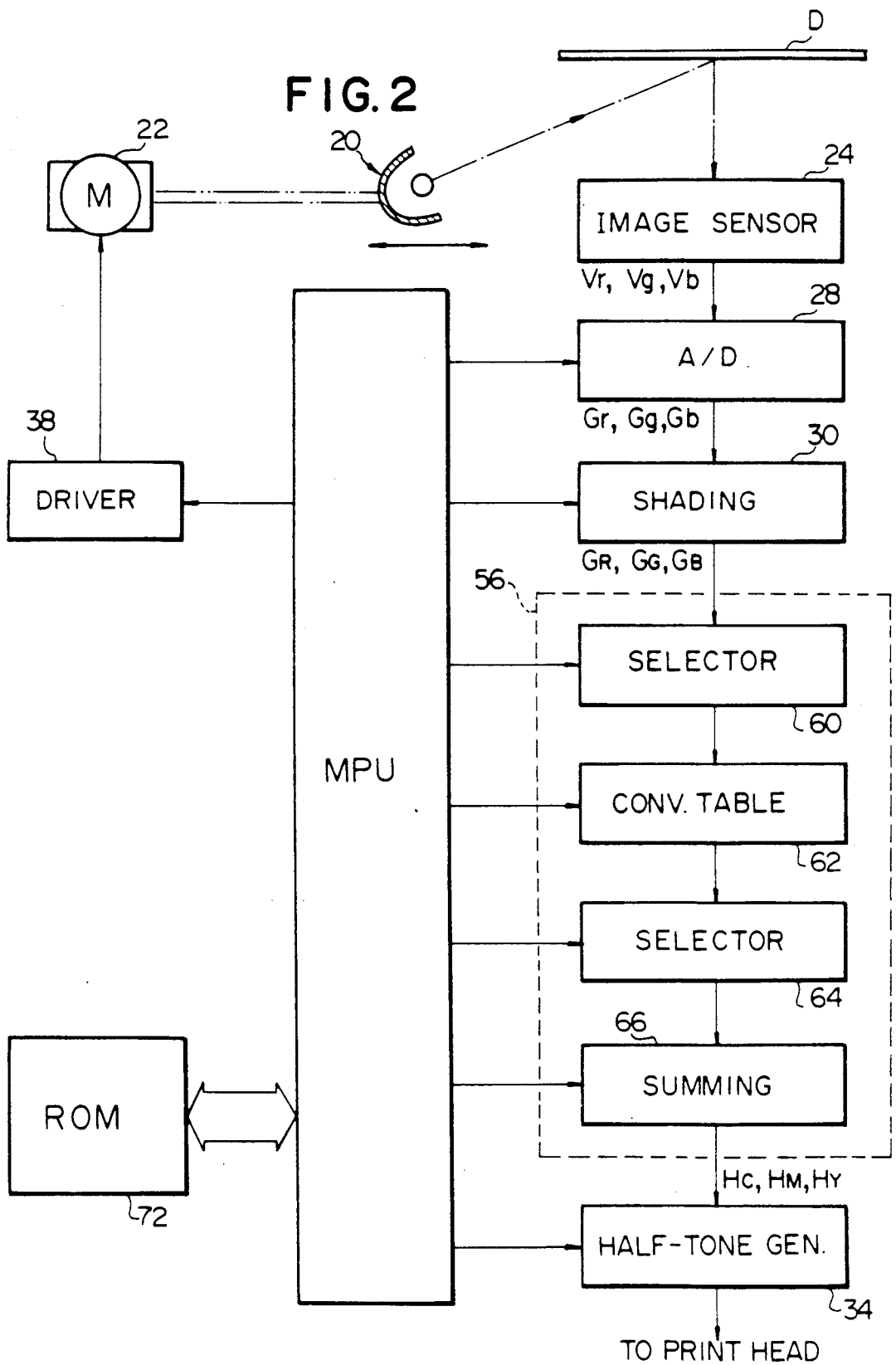
FIG. 2 is a block diagram showing the general construction and arrangement of a colored image reading apparatus embodying the present invention.

Referring to FIG. 2, a colored image reading apparatus embodying the present invention is similar to the prior-art colored image reading apparatus of FIG. 1 in that the apparatus comprises a source of light implemented by a white-light illuminating lamp 20 and a reversible-motion scanner drive motor 22. The scanner drive motor 22 is operatively coupled with the illuminating lamp 20 and drives the lamp 20 for reciprocating movement in the directions of arrowheads a and a' by the motor 22. The light incident on the document sheet D and reflected therefrom is directed to an image sensor 24 through an optical system implemented by a suitable combination of mirrors and lenses.

Figure 3:
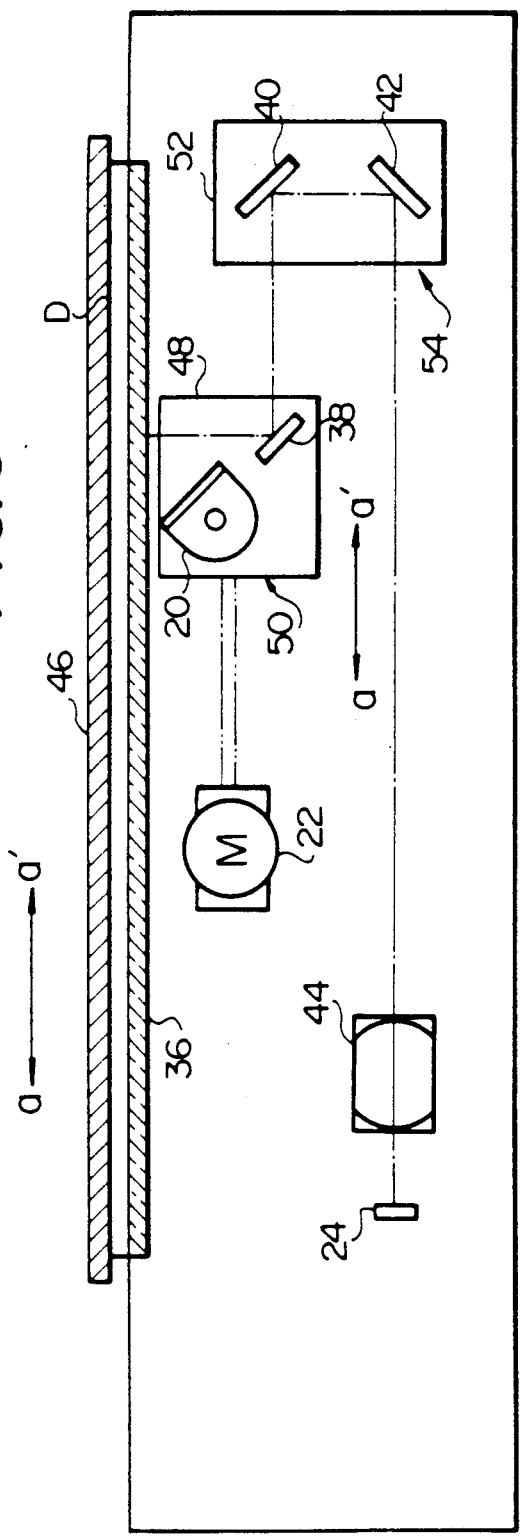
FIG. 3 is a schematic side elevation view showing, partly in section, an example the arrangement of an optical system included in a color printer in which the colored image reading apparatus embodying the present invention is assumed to be incorporated.

FIG. 3 shows an example of such an optical system intervening, in effect, between the document sheet D and image sensor 24. The optical system is provided underneath a transparent document support table 36 and comprises first, second and third mirrors 38, 40 and 42 and a projection lens unit 44. The first mirror 38 is angled at 45 degrees to the document support table 36 and is movable with the illuminating lamp 20. The document sheet D is placed on the document support table 36 with its image-bearing face directed downward and is held in place by means of a cover board 46 which presses the document sheet D against the upper face of the table 36.

The beam of light emitted from the illuminating lamp 20 is incident on the downwardly directed image-bearing face of the document sheet D and picks up images on the document sheet D. The resultant information-carrying beam of light is reflected from the document sheet D to the first mirror 38 and is re-directed by the second and third mirrors 40 and 42. Past the third mirror 42, the light passes through the projection lens unit 44 and is incident on the light receiving face of the image sensor 24.

The illuminating lamp 20 and first mirror 38 are jointly mounted on a carrier 48 to form a main image scanner 50 which is thus composed of the lamp 20, mirror 38 and carrier 48. Similarly, the second and third mirrors 40 and 42 are jointly mounted on a carrier 52 to form a subsidiary image scanner 54 which is composed of the mirrors 40 and 42 and the carrier 52. The main and subsidiary image scanners 50 and 54 are movable to and from a predetermined home position each forwardly in the direction of arrowhead a and backwardly in the direction of arrowhead a. The image scanners 50 and 54 are thus operatively coupled to the scanner drive motor 22 through a suitable reduction mechanism (not shown). The reduction mechanism is designed to drive the image scanners 50 and 54 for movement with a speed ratio of 2:1 each in the direction of arrowhead a from the respective home positions thereof. Upon termination of each cycle of scanning operation, the main and subsidiary image scanners 50 and 54 are driven to move backwardly to the respective home positions thereof each in the direction of arrowhead a'. The optical system constructed and arranged herein shown is merely for the purpose of illustration and may be modified in numerous manners if desired.

The scanner drive motor 22 is controlled to drive each of the main and subsidiary image scanners 50 and 54 to make three reciprocating movements for the scanning of a single document sheet D. The first of these three reciprocating movements results in production of signals on the basis of which pixels are to be printed in cyan. The second one of the reciprocating movements is effected to produce signals for the printing of pixels in magenta. The third reciprocating movement is for the producion of signals on the basis of which pixels are to be printed in yellow.

As the document sheet D is thus optically scanned in three consecutive cycles, the image sensor 24 sequentially produces voltage signals $V_r$, $V_g$ and $V_b$ representing the intensities of the red, green and blue components, respectively, of the light incident on the image sensor 24. The image sensor 24 used in the embodiment of the present invention is also assumed to be implemented by a linear array of charge-coupled devices arranged in combination with color filter elements for red, green and blue.

The analog light-intensity signals $V_r$, $V_g$ and $V_b$ produced from the image sensor 24 are supplied direct to an analog-to-digital converter 28 and are converted into corresponding eight-bit digital signals $G_r$, $G_g$ and $G_b$, respectively. The digital light-intensity signals $G_r$, $G_g$ and $G_b$ thus output from the analog-to-digital converter 28 are supplied through parallel signal lines to a shading generator circuit 30 to compensate for the spurious response components which may be contained in the input signals $G_r$, $G_g$ and $G_b$ as in the prior-art colored image reading apparatus described with reference to FIG. 1. The corrected digital light-intensity signals, now denoted $G_R$, $G_G$ and $G_B$, are transferred sequentially to a masking circuit 56 through which the signals $G_R$, $G_G$ and $G_B$ are referenced to produce signals $H_C$, $H_M$ and $H_Y$ indicative of the quantities $Q_C$, $Q_M$ and $Q_Y$ of cyanic-, magenta- and yellow-colored inks, respectively, to be actually used for the reproduction of the images represented by the supplied signals $G_R$, $G_G$ and $G_B$, respectively.

The signals $H_C$, $H_M$ and $H_Y$ thus output from the masking circuit 32 are supplied to a half-tone generator circuit 34 which produces dither-processed signals variable with the supplied digital signals $H_C$, $H_M$ and $H_Y$. The ditherprocessed signals are supplied to driver circuits for the ink-jet nozzles of, for example, a color printer (not shown) and are used for the control of the quantities $Q_C$, $Q_M$ and $Q_Y$ of the cyanic-, magenta-, and yellow-colored inks to be ejected from the print head of the printer. The analog-to-digital converter 26, shading amplifier 28, masking circuit 56 and half-tone generator circuit 34 as hereinbefore described operate under the control of a microprocessor 58, which also controls a driver circuit 38 for the scanner drive motor 22.

While the color printer with which an colored image reading apparatus according to the present invention is to be used in combination is typically of the ink-jet type, the printer of such a type may be substituted by a printing apparatus of another type such as a thermal transfer printer and an electrophotographic printer. Thus, it should be borne in mind that the term "ink" herein referred to may mean not only an ordinary printing fluid but any of the toning materials used in printers in general including those of the described types.

Construction and Operation of Masking Circuit

The masking circuit 56 provided in the colored image reading apparatus embodying the present invention largely comprises a first-stage switching network 60, a conversion table network 62, a second-stage switching network 64 and a weighted-parameter summing network 66 which are connected in series as shown in FIG. 2.

Figure 4:
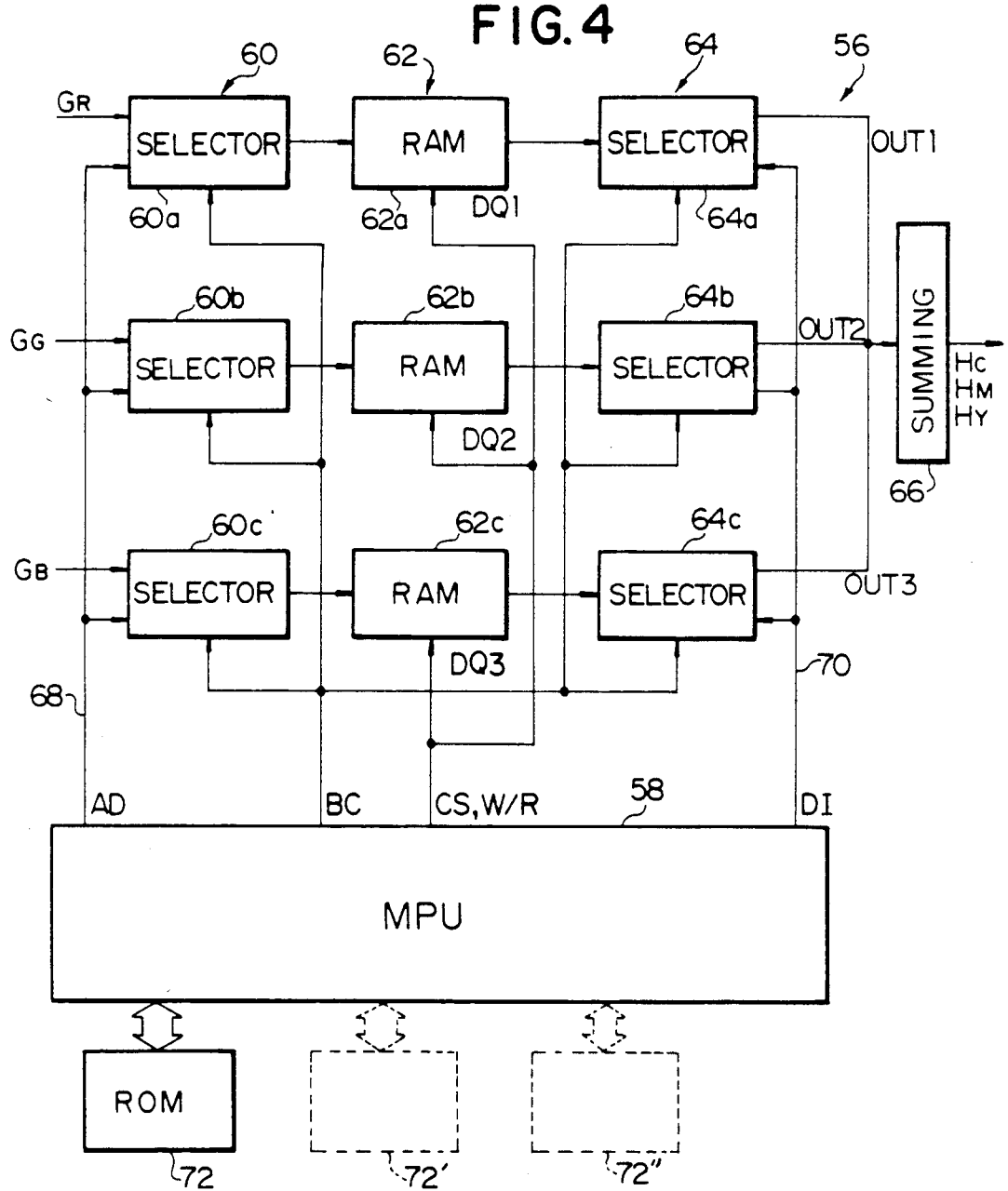
FIG. 4 is a block diagram showing the arrangement of the masking circuit provided in the colored image reading apparatus embodying the present invention.

As illustrated in more detail in FIG. 4, the first-stage switching network 58 comprises first, second and third selector circuits 60a, 60b and 60c each having signal input terminals responsive to each of the corrected digital light-intensity signals $G_R$, $G_G$ and $G_B$, respectively, supplied sequentially from the shading amplifier 30. The selector circuits 60a, 60b and 60c further have address input terminals commonly responsive to eight-bit address signals AD supplied from the microprocessor 58 via an address bus 68 and control terminals commonly responsive to a bus control signal BC also supplied from the microprocessor 58.

The conversion table network 62 comprises first, second and third random-access memories 62a, 62b and 62c each having address input terminals connected to each of the first, second and third selector circuits 60a, 60b and 60c of the first-stage switching network 60, respectively. The random-access memories 62a, 62b and 62c (hereinafter referred to simply as memories) further have chip select and write/read control terminals commonly responsive to write/read control and chip select signals W/R and CS supplied from the microprocessor 58. Any one of the selector circuits 60a, 60b and 60c is selectively enabled by the bus control signal BC from the microprocessor 56 and, when enabled, becomes transparent to the light-intensity signal $G_R$, $G_G$ or $G_B$ from the shading generator circuit 30 or the address signal AD supplied from the microprocessor 58. Thus, when any of the first, second and third selector circuits 60a, 60b and 60c is enabled by the bus control signal BC from the microprocessor 56, either the light-intensity signal $G_R$, $G_G$ or $G_B$ or the address signal AD selectively input to the particular selector circuit 60a, 60b or 60c is passed through the selector circuit to the associated one of the first, second and third memories 62a, 62b and 62c.

The second-stage switching network 64 comprises first, second and third selector circuits 64a, 64b and 64c each having data input/output terminals connected to data input/output terminals of each of the first, second and third memories 62a, 62b and 62c, respectively. Each of the selector circuits 64a, 64b and 64c of the second-stage switching network 64 further has data input terminals responsive to data DI which are to be supplied from the microprocessor 56 via a data bus 70, a control terminal responsive to the bus control signal BC from the microprocessor 58, and data output terminals connected to the summing circuit 66. Thus, each of the selector circuits 64a, 64b and 64c of the second-stage switching network 64 is responsive to the bus control signal BC to (1) receive quantity-of-ink data DQ1, DQ2 or DQ3 from the associated one of the memories 62a, 62b and 62c and transfer the data DQ1, DQ2 or DQ3 to the summing circuit 66 as its output signal OUT1, OUT2 or OUT3, or (2) receive the quantity-of-ink data DI from the microprocessor 58 via the data bus 70 and transfer the data DI to the associated one of the memories 62a, 62b and 62c to store the data into the memories, (3) or pass the data DI fetched from memory 62a, 62b or 62c to the summing circuit 66.

The quantity-of-ink data DQ1, DQ2 or DQ3 which each of the selector circuits 64a, 64b and 64c of the second-stage switching network 64 is to receive from the associated one of the memories 62a, 62b and 62c is representative of the quantities $q_C$, $q_M$ or $q_Y$ of the cyanic-, magenta- or yellow-colored ink which correspond to the values represented by the light-intensity signals $G_R$, $G_G$ and $G_B$.

On the other hand, the quantity-of-ink data DI which the selectors 64a, 64b or 64c are to receive from the microprocessor 58 and transfer to the respectively associated memories 62a, 62b and 62c are also representative of the quantities $q_C$, $q_M$ and $q_Y$ of the cyanic-, magenta- or yellow-colored ink for the various values of the light-intensity signals $G_R$, $G_G$ and $G_B$ and include all the possible data to be stored as the quantity-of-ink data DQ1, DQ2 and DQ3 in the memories 62a, 62b and 62c. These quantity-of-ink data DI are stored in an off-chip read-only memory 72. This read-only memory 72 is exchangeable with another but essentially similar read-only memory in which are stored a modified version of the quantity-of-ink data DI to provide modified color tone characteristics. Thus, the color tone characteristics for printing can be readily modified through exchange of the read-only memory 72 with another one. If desired, two or more of such a read-only memory may be coupled to the microprocessor 58 as indicated at 72, 72' and 72" in FIG. 4 and may be used selectively depending on the desired color tone characteristics.

The quantities $q_C$, $q_M$ or $q_Y$ of the cyanic-, magenta- or yellow-colored inks represented by the data DQ1, DQ2 and DQ3 stored in the memories 62a, 62b and 62c, respectively, are the functions of the values represented by the digital light-intensity signals $G_R$, $G_G$ and $G_B$ supplied to the masking circuit 56. These quantities are calculated in accordance with the following determinant:

$$\begin{vmatrix} q_C \\ q_M \\ q_Y \end{vmatrix} = -\log \begin{vmatrix} a_{00}, a_{01}, a_{02} \\ a_{10}, a_{11}, a_{12} \\ a_{20}, a_{21}, a_{22} \end{vmatrix} \begin{vmatrix} G_R \\ G_G \\ G_B \end{vmatrix}$$

where $a_{00}$ to $a_{02}$ are fixed parameters determined by the spectral reflectance and printing characteristics of the cyanic-colored ink, $a_{10}$ to $a_{12}$ are fixed parameters determined by the spectral reflectance and printing characteristics of the magenta-colored ink, and $a_{20}$ to $a_{22}$ are fixed parameters determined by the spectral reflectance and printing characteristics of the yellow-colored ink.

In respect of the quantities $q_C$ of the cyanic-colored ink, the logarithmic values of the products of multiplication $a_{00}*G_R$ in respect of various possible values of the red-color light-intensity signal $G_R$ are stored as the quantity-of-ink data DQ1 in the first memory 62a, the logarithmic values of the products of multiplication $a_{01}*G_G$ in respect of various possible values of the green-color light-intensity signal $G_G$ are stored as the quantity-of-ink data DQ2 in the second memory 62b, and the logalithmic values of the products of multiplication $a_{02}*G_B$ in respect of various possible values of the blue-color light-intensity signal $G_B$ are stored as the quantity-of-ink data DQ3 in the third memory 62c.

In respect of, the- quantities $q_M$ of the magenta-colored ink, the logarithmic values of the products of multiplication $a_{10}*G_R$, $a_{11}*G_G$ and $a_{12}*G_B$ in respect of various possible values of the red-, green- and blue-color light-intensity signals $G_R$, $G_G$ and $G_B$ are stored as the quantity-of-ink data DI in the off-chip read-only memory 72. In respect of the quantities $q_Y$ of the yellow-colored ink, the logarithmic of the products of multiplication $a_{20}*G_R$, $a_{21}*G_G$ and $a_{22}*G_B$ in respect of various possible values of the red-, green- and blue-color light-intensity signals $G_R$, $G_G$ and $G_B$ are also stored as the quantity-of-ink data DI in the off-chip read-only memory 72. The quantity-of-ink data representative of these logalithmic values are to be fetched from the read-only memory 72 and loaded as the quantity-of-ink data DQ1, DQ2 and DQ3 into the first, second or third memories 62a, 62b or 62c, respectively, during data write cycle of the memory, as will be described in more detail.

The data DQ1, DQ2 and DQ3 representative of the logarithmic values of the quantities $q_C$ of the cyanic-colored ink in respect of the various possible values of the signals $G_R$, $G_G$ and $G_B$ are also stored as the quantity-of-ink data DI in the read-only memory 72 so that, when the quantity-of-ink data regarding the yellow-colored ink is to be converted into quantity-of-ink data regarding the cyanic-colored ink, the former is fetched from the read-only memory 72 and is loaded into each of the first, second and third memories 62a, 62b and 62c.

Figure 5:
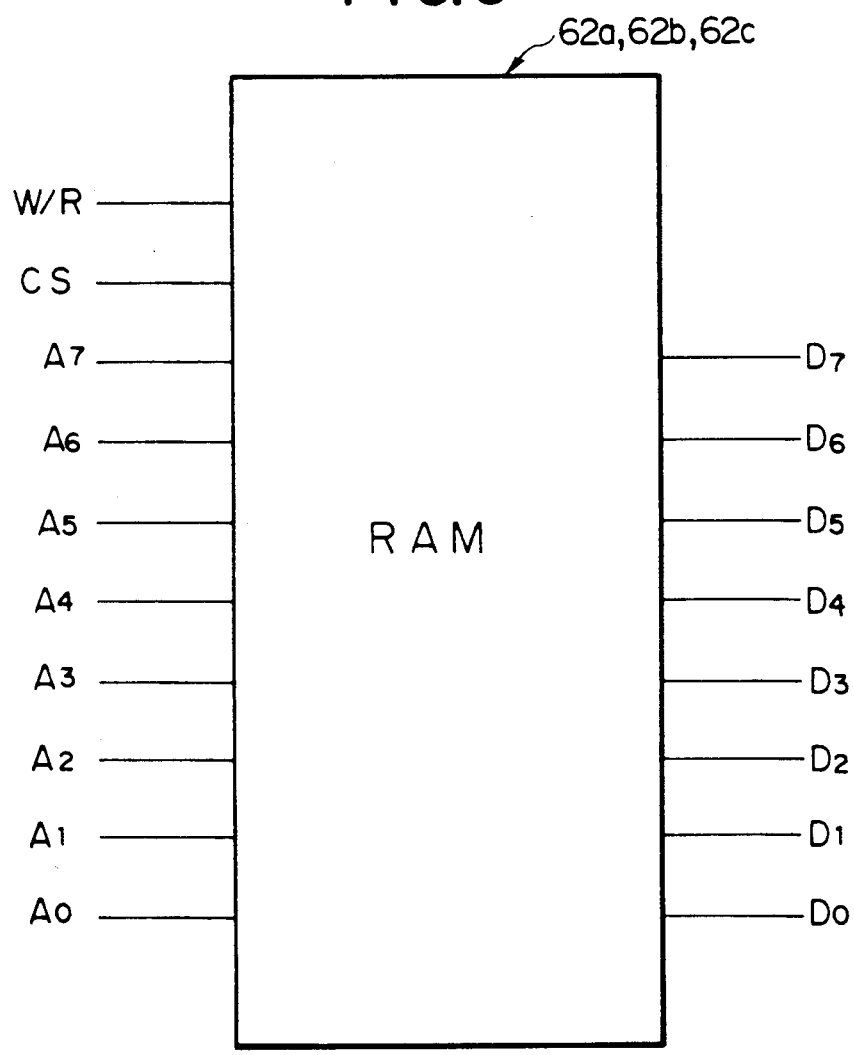
FIG. 5 is a schematic plan view showing the arrangement of terminals or pins of each of the random-access memories included in the masking circuit illustrated in FIG. 4.

Turning to FIG. 5, each of the first, second and third memories 52a, 62b and 62c included in the masking circuit 56 as hereinbefore described has eight address input terminals $A_0$ to $A_7$, eight data input/output terminals $D_0$ to $D_7$, a chip select terminal CS and a write-/read control terminal W/R. At the chip select and write-read control terminals CS and W/R are to be received the chip select and write-read control signals CS and W/R from the microprocessor 58.

At the address input terminals $A_0$ to $A_7$ of each the memories 62a, 62b and 62c is to be received either the eight-bit digital light-intensity signal $G_R$, $G_G$ or $G_B$ from the analog-to-digital converter 28 (FIG. 2) or the address signal AD from the microprocessor 58 (FIG. 4) through the selector 60a, 60b or 60c of the first stage switching network 60. Whether the light-intensity signal $G_R$, $G_G$ or $G_B$ or the address signal AD is to be received is determined by the microprocessor 58 which supplies the bus control signal BC to one of the selectors 60a, 60b and 60c.

When the light-intensity signal $G_R$, $G_G$ or $G_B$ is supplied to the address input terminals $A_0$ to $A_7$ of the memory 62a, 62b or 62c, the memory is enabled to operate in a data read cycle by the write/read signal W/R from the microprocessor 58 to output the quantity-of-ink data DQ1, DQ2 or DQ3 from the address represented by the supplied signal $G_R$, $G_G$ or $G_B$ and release the data from the data input/output terminals $D_0$ to $D_7$. The quantity-of-ink data DQ1, DQ2 or DQ3 thus output from the memory 62a, 62b or 62c is supplied through the associated one of the selectors 64a, 64b or 64c of the second-stage switching network 64 to the weighted-parameter summing circuit 66.

On the other hand, when the address signal AD is supplied to the address input terminals $A_0$ to $A_7$ through the address bus 68, the memory 62a, 62b or 62c is enabled to operate in a data write cycle by the write/read signal W/R from the microprocessor 58. In this instance, the quantity-of-ink data DI is fetched from the read-only memory 72 and is supplied from the microprocessor 58 to the memory 62a, 62b or 62c through the data bus 70 and the associated one of the selectors 64a, 64b or 64c of the second-stage switching network 64. The quantity-of-ink data DI is loaded as the quantity-of-ink data DQ1, DQ2 or DQ3 into the memory through the data input/output terminals $D_0$ to $D_7$ of the memory and is stored at the address designated by the address signal AD.

In the following table is indicated an example of the set of quantity-of-ink data thus stored in the memories 62a, 62b and 62c at the addresses "00000000" to "11111111" which may be represented by the digital light-intensity signals $G_R$, $G_G$ and $G_B$ or the address signal AD. It may be noted that the quantity-of-ink data for the parameter $a_{00}$, in particular, is given by the bit sequence "10110010".

| Address | Data |
| --- | --- |
| 00000000 | 10110010 |
| 00000001 | 10110010 |
| 00000010 | 10110010 |
| . | . |
| . | . |
| . | . |
| 11011101 | 01110001 |
| 11011101 | 01110000 |
| 11011110 | 01101111 |
| . | . |
| . | . |
| 11111100 | 00100011 |
| 11111101 | 00010110 |
| 11111110 | 00000000 |
| 11111111 | 00000000 |

Figure 6:
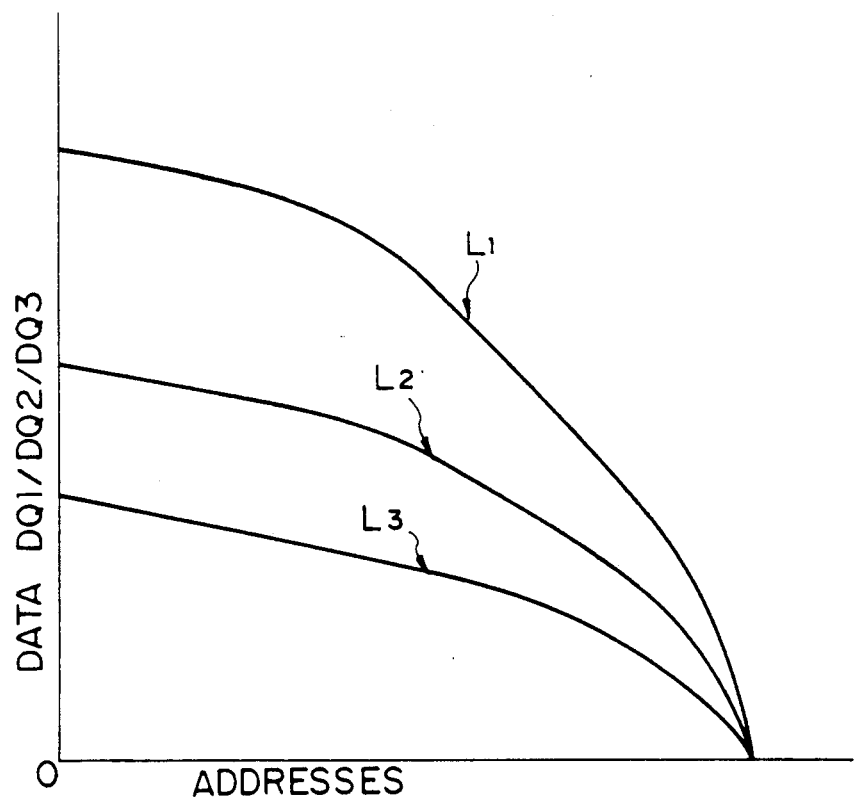
FIG. 6 is a graphic representation of the values represented by the quantity-of-ink data stored in the random-access memories included in the masking circuit illustrated in FIG. 4.

The quantity-of-ink data used in the colored image reading apparatus according to the present invention is thus provided in the form of the logalithmic values of the products of multiplication of the fixed parameters $a_{00}$ to $a_{22}$ and the various possible values of the light-intensity signals $G_R$, $G_G$ and $G_B$. FIG. 6 shows curves $L_1$, $L_2$ and $L_3$ which graphically indicate the values represented by these quantity-of-ink data in terms of the addresses at which the data are stored in the memories 62a, 62b and 62c, respectively.

The quantity-of-ink data DQ1, DQ2 and DQ3 fetched from the memories 62a, 62b and 62c are supplied as the output signals OUT1, OUT2 and OUT3, respectively, of the selectors 64a, 64b and 64c of the second-stage switching network 64 to the weighted-parameter summing circuit 66 and are summed up to form a signal $H_C$, $H_M$ or $H_Y$ indicative of the quantity $Q_C$, $Q_M$ or $Q_Y$ of the cyanic-, magenta- or yellow-colored ink to be used for the reproduction of the images represented by the supplied signals $G_R$, $G_G$ and $G_B$, respectively. As described previously, the signal $H_M$, $H_Y$ and $H_C$ thus output from the masking circuit 56 is supplied to the half-tone generator circuit 34, from which the dither-processed signals produced from the supplied digital signals $H_M$, $H_Y$ and $H_C$ are supplied to the driver circuits for the print L- head to control the quantities $Q_C$, $Q_M$ or $Q_Y$ of the cyanic-, magenta-, or yellow-colored inks to be ejected from the print head.

Figure 7A:
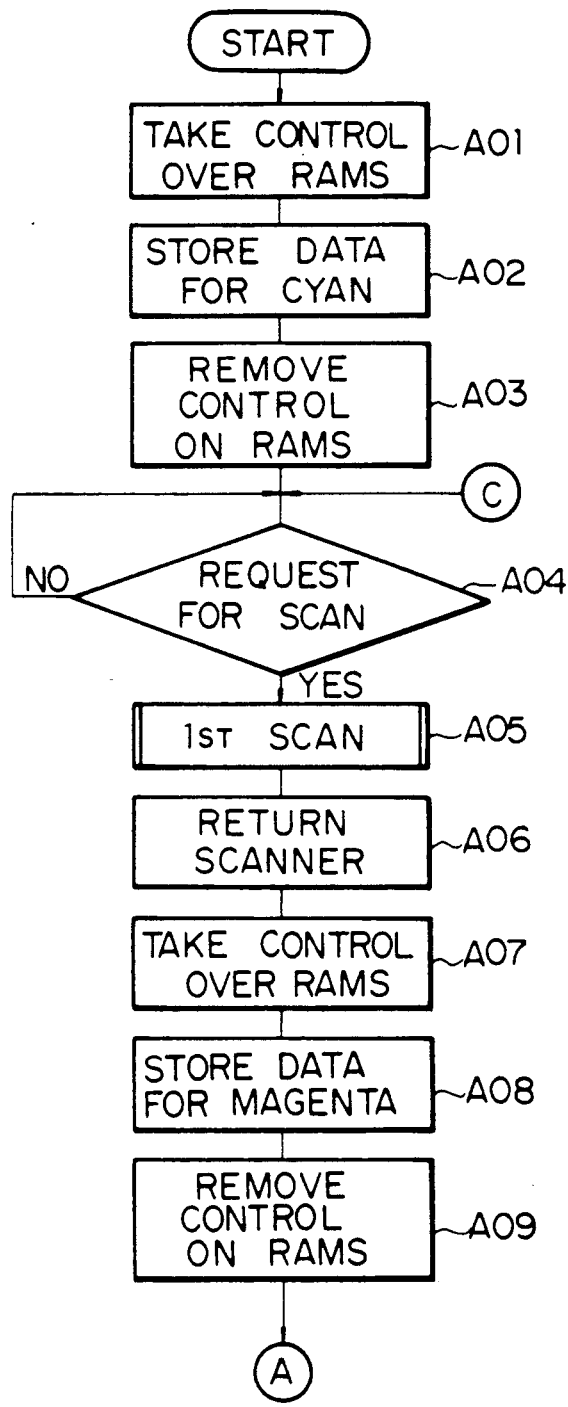

Operation of the colored image reading apparatus thus constructed and arranged in accordance with the present invention will be hereinafter described with further reference to the flowcharts of FIGS. 7A to 7C.

Before the printer is started for operation, the operator of the apparatus places an original document sheet D on the document support table 36 (FIG. 3). The operator will then depress the print start switch (not shown) provided on the apparatus. The microprocessor 58 is activated start the execution of the routine program incorporated therein and at step A01 (FIG. 7A) supplies the bus control signal BC to each of the selectors 60a, 60b and 60c of the first-stage switching network 60 and each of the selectors 64a, 64b and 64c of the second-stage switching network 64 of the masking circuit 56. The address bus 68 for transmitting the address signal AD from the microprocessor 58 is thus connected through the selectors 60a, 60b and 60c of the first-stage switching network 60 to the address input terminals $A_0$ to $A_7$ of the memories 62a, 62b and 62c, respectively. In addition, the data bus 70 for transmitting the quantity-of-ink data DI from the microprocessor 58 is connected through the selectors 64a, 64b and 64c of the second-stage switching network 64 to the data input/output terminals $D_0$ to $D_7$ of the memories 62a, 62b and 62c, respectively. Thus, the memories 62a, 62b and 62c of the masking circuit 56 are held under the control of the microprocessor 58 and are enabled to send out the quantity-of-ink data DQ1, DQ2 and DQ3 therefrom or receive the quantity-of-ink data DI from the microprocessor 58.

The microprocessor 58, now in control of the memories 62a, 62b and 62c, proceeds to step A02 to output a sequence of address signals AD to the address bus 68. This sequence of address signals AD starts with the address "00000000" and is successively incremented toward the final address "11111111". Then, the microprocessor 58 fetches from the read-only memory 72 the quantity-of-ink data DI for the cyanic-colored ink for the various possible values of the signals $G_R$, $G_G$ and $G_B$. These quantity-of-ink data DI are supplied through the data bus 70 and the selectors 64a, 64b and 64c of the second-stage switching network 64 to the memories 62a, 62b and 62c in synchronism with the address signals AD with the individual memories 62a, 62b and 62c selected sequentially by the chip select signal from the microprocessor 58. The data DI are then loaded into the memories 62a, 62b and 62c through the data input/output terminals $D_0$ to $D_7$ of each of the memories and are stored as the quantity-of-ink data DQ1, DQ2 or DQ3 at the addresses respectively represented by the address signals AD.

After the quantity-of-ink data DI have thus been stored as the quantity-of-ink data DQ1, DQ2 or DQ3 into each of the memories 62a, 62b and 62c at step A02, the microprocessor 58 proceeds to step A03 to supply the bus control signal BC to each of the selectors 60a, 60b and 60c of the first-stage switching network 60 and each of the selectors 64a, 64b and 64c of the second-stage switching network 64. Each of the selectors 60a, 60b and 60c of the first-stage switching network 60 is now activated to have its address input terminals $A_0$ to $A_7$ connected to the output terminals of the shading generator circuit 30, while each of the selectors 64a, 64b and 64c of the second-stage switching network 64 has its input/output terminals $D_0$ to connected to the input terminals of the summing circuit 66. The memories 62a, 62b and 62c are thus allowed to the digital light-intensity signals $G_R$, $G_G$ and $G_B$ from the shading generator circuit 30 through the selectors 60a, 60b and 60c output the quantity-of-ink data DQ1, DQ2 and DQ3 responsive to the supplied signals $G_R$, $G_G$ and $G_B$, respectively. These quantity-of-ink data DQ1, DQ2 and DQ3 are transmitted through the selectors 64a, 64b and 64c to the summing circuit 66 as the output signals OUT1, OUT2 and OUT3.

The microprocessor 58 then checks at step A04 if there is a request for the first cycle of scanning operation for the document sheet D currently held in place on the document support table 36. Such a request may be given by an instruction signal output from a suitable host computer (not shown) to which the colored image reading apparatus under consideration may be coupled. If the answer for this decision step A04 is given in the negative, the step A04 is repeated until the answer for the step A04 turns affirmative. When it is found at this step A04 that there is a request for the first cycle of scanning operation issued from, for example, the host computer, the microprocessor 56 outputs a control signal to start the scanner drive motor 22 as at step A05. Thus, the scanner drive motor 22 drives the main and subsidiary image scanners 50 and 54 for movement from their respective home positions each forwardly in the direction of arrowhead a to scan the images on the document sheet D by a beam of light emanating from the illuminating lamp 20. The beam of light emitted from the illuminating lamp 20 is incident on the image-bearing face of the document sheet D through the transparent document support table 36 and is modulated by the patterns and colors of the images picked up from the the document sheet D. The resultant information-carrying light reflected from the document sheet D is directed to the light receiving face of the image sensor 24 and enables the image sensor 24 to sequentially produces the voltage signals $V_r$, $V_g$ and $V_b$ which vary with the intensities of the red, green and blue components, respectively, of the incoming light.

The analog light-intensity signals $V_r$, $V_g$ and $V_b$ thus produced from the image sensor 24 are supplied direct to the analog-to-digital converter 28 and are converted into corresponding eight-bit digital signals $G_r$, $G_g$ and $G_b$, respectively. These digital light-intensity signals $G_r$, $G_g$ and $G_b$ are supplied through the parallel signal lines to the shading generator circuit 30 to compensate for the spurious response components which may be contained therein. The corrected digital light-intensity signals $G_R$, $G_G$ and $G_B$, are transferred sequentially to the masking circuit 56. The selectors 60a, 60b and 60c of the first-stage switching network 60 of the masking circuit 56 having been connected to the shading generator circuit 30, the light-intensity signals $G_R$, $G_G$ and $G_B$ output from the shading generator circuit 30 are fed to the address input terminals $A_0$ to $A_7$ of the memories 62a, 62b and 62c through the selectors 60a, 60b and 60c. In response to these light-intensity signals $G_R$, $G_G$ and $G_B$, the memories 62a, 62b and 62c respectively output the quantity-of-ink data DQ1, DQ2 and DQ3 indicating the quantities $q_C$ of, specifically, the cyanic-colored ink which are stored at the addresses designated by the input signals $G_R$, $G_G$ and $G_B$. These quantity-of-ink data DQ1, DQ2 and DQ3 are transmitted through the selectors 64a, 64b and 64c to the summing circuit 66 as the output signals OUT1, OUT2 and OUT3, with the result that the summing circuit 66 produces an output signal $H_C$ indicating the quantity $Q_C$ of the cyanic-colored ink to be ejected from the print head. This signal $H_C$ is produced as a function of the input signals $G_R$, $G_G$ and $G_B$ in the form of $$H_C = a_{00} \cdot G_R + a_{01} \cdot G_G + a_{02} \cdot G_R.$$

The signal $H_C$ thus output from the masking circuit 32 is supplied to the half-tone generator circuit 34 which produces dither-processed signals variable with the supplied digital signal $H_C$. The dither-processed signals in turn are supplied to the driver circuits of the print head whereby a line of pixels is printed in cyan with densities variable with the supplied dither-processed signals. Lines of pixels are thus successively printed in cyan as the document sheet D is scanned by the main scanner 50 during the first cycle of scanning operation. When the main scanner 50 reaches a predetermined final position with respect to the document sheet D, then the microprocessor 58 outputs an instruction signal demanding the scanner drive motor 22 to reverse its direction of rotation as at step A06 so that the main and subsidiary scanners 50 and 54 start to return toward their home positions each in the direction of arrowhead a.

When the first cycle of scanning operation is complete with the scanners 50 and 54 moved back to their respective home positions, the microprocessor 58 proceeds to step A07 to supply the bus control signal BC for a second time to each of the selectors 60a, 60b and 60c of the first-stage switching network 60 and each of the selectors 64a, 64b and 64c of the second-stage switching network 64 of the masking circuit 56. The address bus 68 is thus connected through the selectors 60a, 60b and 60c and the data bus 70 is connected through the selectors 64a, 64b and 64c of the second-stage switching network 64 to the data input/output terminals $D_0$ to $D_7$ of the memories 62a, 62b and 62c, respectively. Thus, the memories 62a, 62b and 62c of the masking circuit 56 are for a second time held under the control of the microprocessor 58.

The microprocessor 58 then proceeds to step A08 to output a sequence of address signals AD to the address bus 68 and fetches from the read-only memory 72 the quantity-of-ink data DI for the magenta-colored ink for the various possible values of the signals $G_R$, $G_G$ and $G_B$. These quantity-of-ink data DI are supplied through the data bus 70 and the selectors 64a, 64b and 64c of the second-stage switching network 64 to the memories 62a, 62b and 62c and are stored as the quantity-of-ink data DQ1, DQ2 or DQ3 at the addresses represented by the address signals AD.

Subsequently, the microprocessor 58 proceeds to step A09 to supply the bus control signal BC to the selectors 60a, 60b and 60c and the selectors 64a, 64b and 64c so that each of the selectors 60a, 60b and 60c is activated to have its address input terminals $A_0$ to $A_7$ connected to the shading generator circuit 30, and each of the selectors 64a, 64b and 64c has its input/output terminals $D_0$ to $D_7$ connected to the summing circuit 66. The memories 62a, 62b and 62c are thus allowed to receive the light-intensity signals $G_R$, $G_G$ and $G_B$ from the shading generator circuit 30 through the selectors 60a, 60b and 60c and output the quantity-of-ink data DQ1, DQ2 and DQ3 responsive to the supplied signals $G_R$, $G_G$ and $G_B$, respectively. These quantity-of-ink data DQ1, DQ2 and DQ3 are transmitted through the selectors 64a, 64b and 64c to the summing circuit 66.

The microprocessor 58 then checks at step A10 (FIG. 7B) if the first cycle of scanning operation has been terminated with the main and subsidiary scanners 50 and 54 moved back to their respective home positions. Such a test may be made on the basis of signals produced by suitable position sensors located in conjunction with the main and subsidiary scanners 50 and 54, though not shown in the drawings. If the answer for this decision step is given in the negative, the step A10 is repeated until the answer for the step A10 turns affirmative. When it is found that the first cycle of scanning operation is complete, the microprocessor 56 outputs the control signal to start the scanner drive motor 22 as at step A11. Thus, the scanner drive motor 22 drives the main and subsidiary image scanners 50 and 54 for starting the second cycle of scanning operation.

During the second cycle of scanning operation, the memories 62a, 62b and 62c respectively output the quantity-of-ink data DQ1, DQ2 and DQ3 indicating the quantities $q_M$ of the magenta-colored ink which are stored at the addresses designated by the signals $G_R$, $G_G$ and $G_B$ input to the memories 62a, 62b and 62c. These quantity-of-ink data DQ1, DQ2 and DQ3 are transmitted through the selectors 64a, 64b and 64c to the summing circuit 66 as the output signals OUT1, OUT2 and OUT3, with the result that the summing circuit 66 produces an output signal $H_M$ indicating the quantity $Q_M$ of the magenta-colored ink to be ejected from the print head. This signal $H_M$ is produced as a function of the input signals $G_R$, $G_G$ and $G_B$ in the form of $$H_M = a_{10} \cdot G_R + a_{11} \cdot G_G + a_{12} \cdot G_R.$$

During the second cycle of scanning operation, lines of pixels are thus successively printed in magenta with densities variable with the dither-processed signals supplied from the half-tone generator circuit 34 responsive to the signal $H_M$. When the main scanner 50 reaches the predetermined final position with respect to the document sheet D, then the microprocessor 58 outputs an instruction signal demanding the scanner drive motor 22 to reverse its direction of rotation as at step A12 so that the main and subsidiary scanners 50 and 54 start to return toward their respective home positions.

When the second cycle of scanning operation is complete with the scanners 50 and 54 moved back for a second time to their respective home positions, the microprocessor 58 proceeds to step A13 to supply the bus control signal BC to each of the selectors 60a, 60b and 60c and each of the selectors 64a, 64b and 64c. The address bus 68 is thus connected through the selectors 60a, 60b and 60c and the data bus 70 is connected through the selectors 64a, 64b and 64c to the memories 62a, 62b and 62c, respectively. The microprocessor 58 then proceeds to step A14 to output a sequence of address signals AD to the address bus 68 and fetches from the read-only memory 72 the quantity-of-ink data DI for the yellow-colored ink for the various possible values of the signals $G_R$, $G_G$ and $G_B$. These quantity-of-ink data DI are supplied through the data bus 70 and the selectors 64a, 64b and 64c to the memories 62a, 62b and 62c and are stored as the quantity-of-ink data DQ1, DQ2 or DQ3 at the addresses represented by the address signals AD.

The microprocessor 58 then proceeds to step A15 to supply the bus control signal BC to the selectors 60a, 60b and 60c and the selectors 64a, 64b and 64c so that each of the selectors 60a, 60b and 60c is activated to have its address input terminals $A_0$ to $A_7$ connected to the shading generator circuit 30, and each of the selectors 64a, 64b and 64c has its input/output terminals $D_0$ to $D_7$ connected to the the summing circuit 66. The memories 62a, 62b and 62c are thus allowed to receive the light-intensity signals $G_R$, $G_G$ and $G_B$ from the shading generator circuit 30 through the selectors 60a, 60b and 60c and output the quantity-of-ink data DQ1, DQ2 and DQ3 responsive to the supplied signals $G_R$, $G_G$ and $G_B$, respectively. These quantity-of-ink data DQ1, DQ2 and DQ3 are transmitted through the selectors 64a, 64b and 64c to the summing circuit 66. When it is found at step A16 that the second cycle of scanning operation is complete, the microprocessor 56 outputs the control signal to start the scanner drive motor 22 as at step A17. The scanner drive motor 22 now drives the main and subsidiary image scanners 50 and 54 for starting the third cycle of scanning operation.

The selectors 60a, 60b and 60c having been connected to the shading generator circuit 30, the digital signals $G_R$, $G_G$ and $G_B$ output from the shading generator circuit 30 are also fed to the memories 62a, 62b and 62c through the selectors 60a, 60b and 60c. Accordingly, the memories 62a, 62b and 62c are enabled to output the quantity-of-ink data DQ1, DQ2 and DQ3 indicating the quantities $q_Y$ of the yellow-colored ink which are stored at the addresses designated by the input signals $G_R$, $G_G$ and $G_B$. These quantity-of-ink data DQ1, DQ2 and DQ3 are transmitted through the selectors 64a, 64b and 64c to the summing circuit 66, with the result that the summing circuit 66 produces an output signal $H_Y$ indicating the quantity $Q_Y$ of the yellow-colored ink to be ejected from the print head. This signal $H_Y$ is produced as a function of the input signals $G_R$, $G_G$ and $G_B$ in the form of $$H_Y = a_{20} \cdot G_R + a_{21} \cdot G_G + a_{22} \cdot G_R.$$

Lines of pixels are thus successively printed in yellow with densities variable with the dither-processed signals supplied from the half-tone generator circuit 34 responsive to the signal $H_Y$ as the document sheet D is scanned by the main scanner 50 When the main scanner 50 reaches the predetermined final position, then the microprocessor 58 outputs an instruction signal demanding the scanner drive motor 22 to reverse its direction of rotation as at step A18 (FIG. 7C) so that the main and subsidiary scanners 50 and 54 start to return toward their respective home positions.

In consequence of the first, second and third cycles of scanning and printing operation, pixels are printed in cyan, magenta and yellow on a suitable record medium such as typically a sheet of paper. The image pattern thus printed on the record medium may thus include areas printed in each of cyan, magenta and yellow and areas printed in any two or three of the three colors with pixels of one color superposed on or located adjacent to those of another.

Upon completion of the three cycles of scanning operation, the microprocessor 58 proceeds to step A19 to supply the bus control signal BC to each of the selectors 60a, 60b and 60c and each of the selectors 64a, 64b and 64c. The address bus 68 is thus connected through the selectors 60a, 60b and 60c and the data bus 70 is connected through the selectors 64a, 64b and 64c to the memories 62a, 62b and 62c, respectively. The microprocessor 58 then proceeds to step A20 to output a sequence of address signals AD to the address bus 68 and fetches from the read-only memory 72 the quantity-of-ink data DI for the cyanic-colored ink for the various possible values of the signals $G_R$, $G_G$ and $G_B$. These quantity-of-ink data DI are supplied through the data bus 70 and the selectors 64a, 64b and 64c to the memories 62a, 62b and 62c and are stored as the quantity-of-ink data DQ1, DQ2 or DQ3 at the addresses represented by the address signals AD.

The microprocessor 58 then proceeds to step A21 to supply the bus control signal BC to the selectors 60a, 60b and 60c and the selectors 64a, 64b and 64c so that each of the selectors 60a, 60b and 60c is activated to have its address input terminals $A_0$ to $A_7$ connected to the shading generator circuit 30, and each of the selectors 64a, 64b and 64c has its input/output terminals $D_0$ to $D_7$ connected to the the summing circuit 66. The memories 62a, 62b and 62c are thus allowed to receive the light-intensity signals $G_R$, $G_G$ and $G_B$ from the shading generator circuit 30 through the selectors 60a, 60b and 60c and output the quantity-of-ink data DQ1, DQ2 and DQ3 responsive to the supplied signals $G_R$, $G_G$ and $G_B$, respectively. These quantity-of-ink data DQ1, DQ2 and DQ3 are transmitted through the selectors 64a, 64b and 64c to the summing circuit 66.

The microprocessor 58 then checks at step A22 if the scanners 50 and 54 have been moved back to their respective home positions and, when the answer for this decision step A22 is given in the affirmative, the microprocessor 58 reverts to step A04 to start the three cycles of scanning operation for a new document sheet D.

It has been described that the off-chip read-only memory 72 stores the quantity-of-ink data DI representative of the quantities $q_C$, $q_M$ and $q_Y$ of the cyanic-, magenta- or yerllow-colored ink for the various possible values of the light-intensity signals $G_R$, $G_G$ and $G_B$. If desired, however, such a memory may be substituted by a read-only memory simply storing data representative of the fixed parameters $a_{00}$ to $a_{22}$. In this instance, the microprocessor 58 is designed to read these data from the memory, multiply the parameters $a_{00}$ to $a_{22}$ by values represented by bit sequences "00000000" to "11111111", calculate the logalithmic values of the products of multiplication, and successively load the data representative of these values into the memories 62a, 62b and 62c at the addresses represented by the bit sequences "00000000" to "11111111", respectively. The read-only memory storing the fixed parameters $a_{00}$ to $a_{22}$ may also be arranged to be exchangeable with another but essentially similar read-only memory storing modified versions of the parameters $a_{00}$ to $a_{22}$ to provide modified color tone characteristics.

Figure 8:
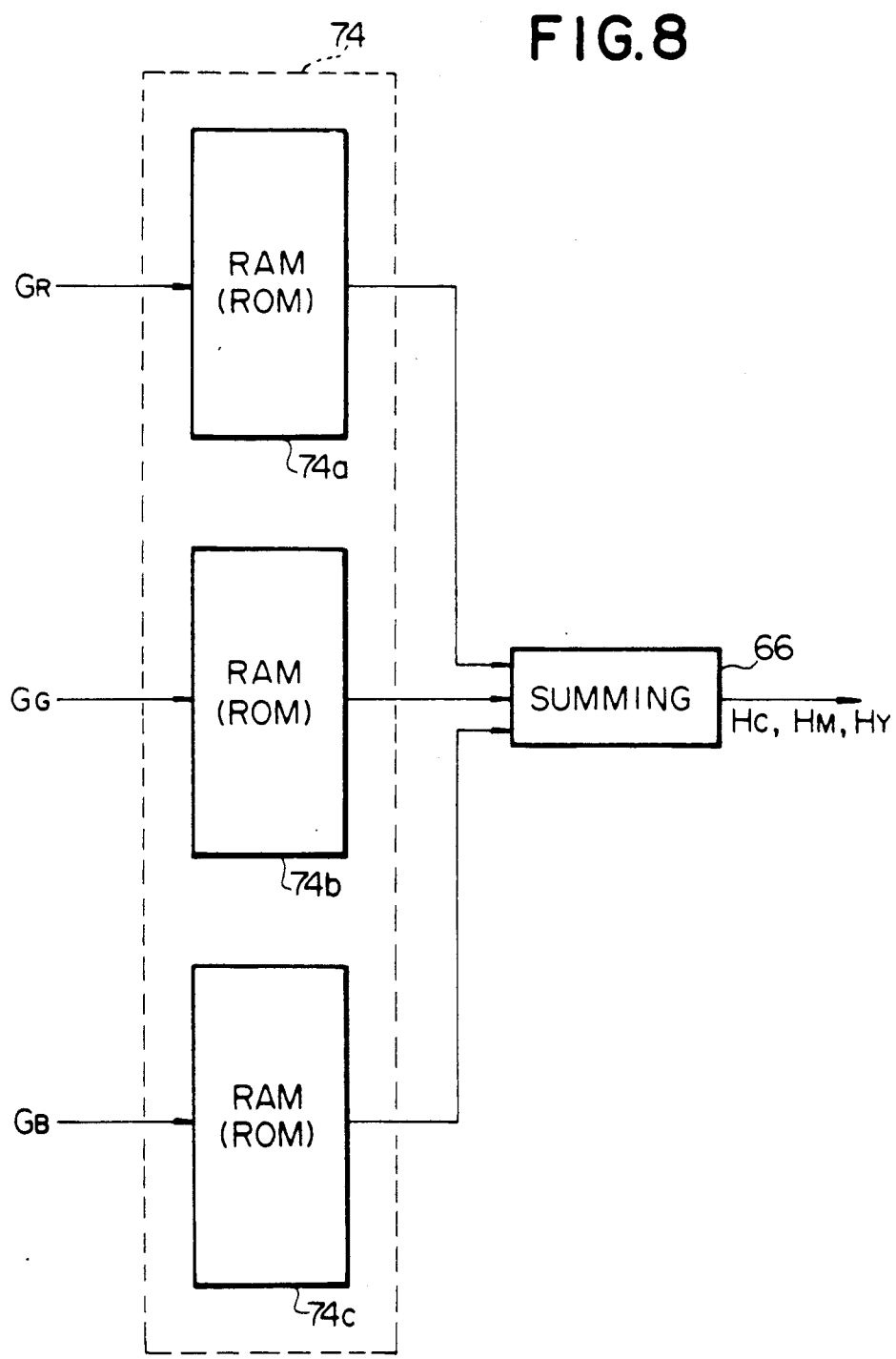
FIG. 8 is a block diagram showing an alternative example of the conversion table network also included in the masking circuit.

FIG. 8 shows an alternative example of the conversion table network 62 included in the masking circuit 56 described with reference to FIG. 4. The conversion table network herein shown, now designated in its entirety by reference numeral 74 comprises a parallel combination of first, second and third random-access memories 74a, 74b and 74c. These memories 74a, 74b and 74c have their respective address input terminals connected to the output terminals of the shading generator circuit 30 and thus responsive to the digital light-intensity signals $G_R$, $G_G$ and $G_B$ produced by the circuit 30. The memories 74a, 74b and 74c further have respective output terminals connected in parallel to the weighted-parameter summing circuit 66 which forms part of the masking circuit 56 including the conversion table network 74.

In these three memories 74a, 74b and 74c are stored quantity-of-ink data representing the quantities $q_C$, $q_M$ and $q_Y$ of the cyanic-, magenta- and yellow-colored inks for all the possible values of the light-intensity signal $G_R$, $G_G$ and $G_B$, respectively. Thus, the first memory 74a has stored therein the quantity-of-ink data representing the quantities $q_C$, $q_M$ and $q_Y$ of the cyanic-, magenta- and yellow-colored inks for all the possible values of the red-color light-intensity signal $G_R$. The second memory 74b has stored therein the quantity-of-ink data representing the quantities $q_C$, $q_M$ and $q_Y$ of the cyanic-, magenta- and yellow-colored inks for all the possible values of the green-color light-intensity signal $G_G$. The third memory 74c has stored therein the quantity-of-ink data representing the quantities $q_C$, $q_M$ and $q_Y$ of the cyanic-, magenta- and yellow-colored inks for all the possible values of the blue-color light-intensity signal $G_B$.

In each of these memories 74a, 74b and 74c, the data representative of the quantities $q_C$, $q_M$ and $q_Y$ of the cyanic-, magenta- and yellow-colored inks are stored in separate address spaces, respectively, so that the addresses designated by each of the supplied light-intensity signals $G_R$, $G_G$ and $G_B$ are altered during each cycle of scanning and printing operation. Insofar, however, as the fixed parameters $a_{00}$ to $a_{22}$ used for the calculation of the quantities $q_C$, $q_M$ and $q_Y$ of inks are maintained unchanged, the contents of the memories 74a, 74b and 74c can also be maintained unchanged and, for this reason, a random-access memory of a relatively small capacity may be used as each of the memories 74a, 74b and 74c. It may be noted that, where inks of particular types and/or makes are used and are not to be exchanged those of other types and/or makes, the random-access memories 74a, 74b and 74c forming the conversion table network 74 arranged as herein shown may be substituted by read-only memories holding data similar to those stored in the former, as indicated in parentheses in FIG. 8.

Figure 9:
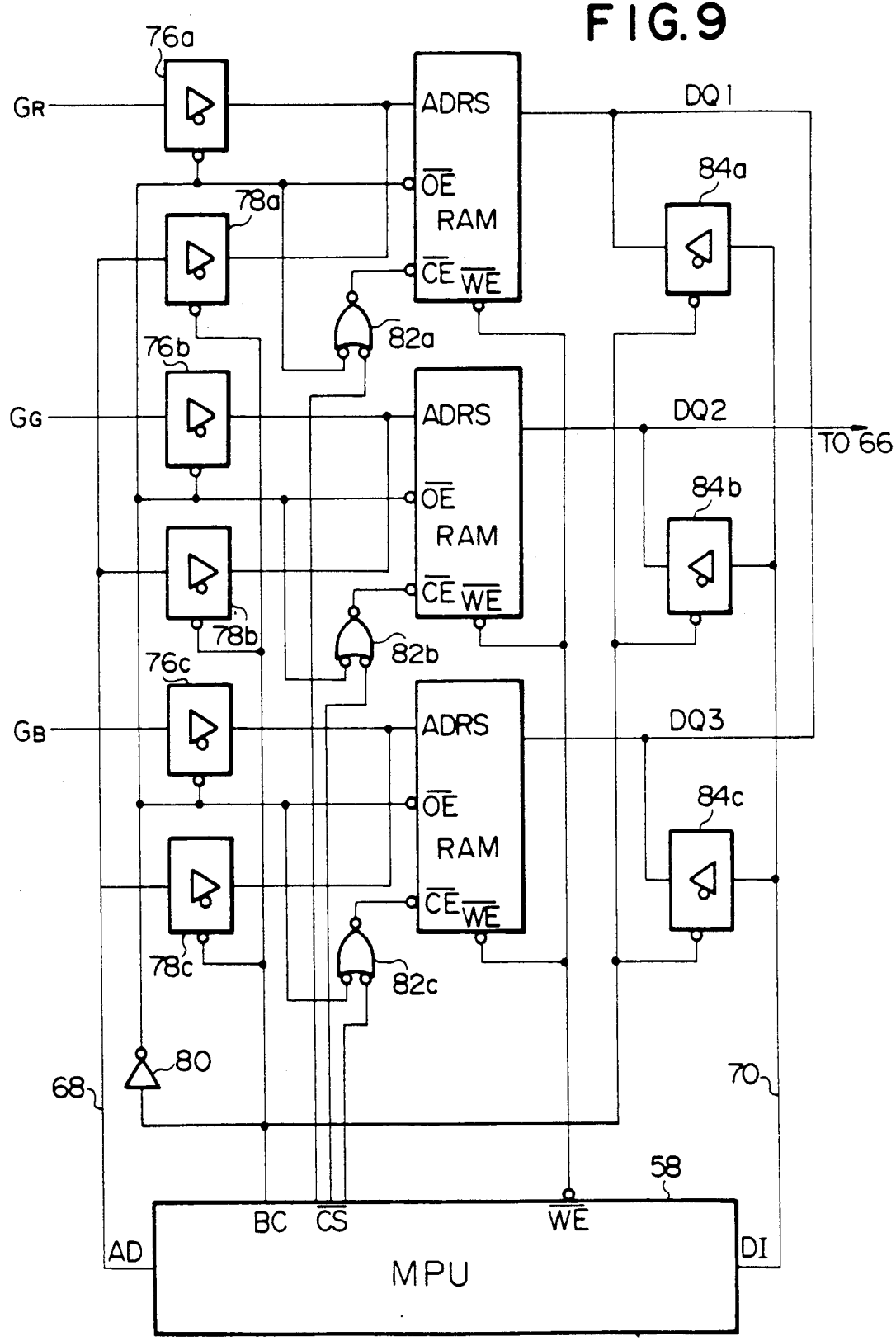
FIG. 9 is a block diagram showing the arrangement of a modification of the masking circuit illustrated in FIG. 4.

FIG. 9 shows an alternative example of the masking circuit 56 provided in the hereinbefore described embodiment. In the masking circuit herein shown, a parallel combination of two tri-state gate circuits is used in substitution for the selectors 60a, 60b and 60c of the first-stage switching network 60 of the masking circuit 56 of the described embodiment. Thus, a first parallel combination of tri-state gate circuits 76a and 78a are connected commonly to the address input terminals ADRS of the first memory 62a. A second parallel combination of tri-state gate circuits 76b and 78b are connected commonly to the address input terminals ADRS of the second memory 62b. A parallel combination of tri-state gate circuits 76c and 78c are connected commonly to the address input terminals ADRS of the third memory 62c. The tri-state gate circuits 76a, 76b and 76c have input terminals responsive to the signals $G_R$, $G_G$ and $G_B$, respectively, from the shading generator circuit 30 and control terminals responsive through an inverter 80 to the bus control signal BC from the microprocessor 58. The tri-state gate circuits 78a, 78b and 78c have input terminals commonly responsive to the address signal AD from the microprocessor 58 and control terminals responsive directly to the bus control signal BC from the microprocessor 58. The bus control signal BC from the microprocessor 58 is also applied to an output enable terminal $\overline{OE}$ of each of the memories 62a, 62b and 62c through the inverter 80 and to one input terminal of each of two-input AND gates 82a, 82b and 82c having output terminals connected to chip select terminals $\overline{CS}$ of the memories 62a, 62b and 62c and each having a second input terminal responsive to the chip select signal $\overline{CS}$ from the microprocessor 58.

In substitution for the selectors 64a, 64b and 64c of the second-stage switching network 64 of the masking circuit 56 described with reference to FIG. 4 are tri-state gate circuits 84a, 84b and 84c which have input terminals responsive to the quantity-of-ink data DI from the microprocessor 58, output terminals connected to the input/output terminals of the memories 62a, 62b and 62c, and control terminals responsive to the bus control signal BC from the microprocessor 58 as shown.

In the masking circuit thus constructed and arranged, the memories 62a, 62b and 62c are disconnected from the microprocessor 58 when high-impedance states are established in the tri-state gate circuits 84a, 84b and 84c, respectively, in the presence of the bus control signal BC of a high level output from the microprocessor 58. Under these conditions, the quantity-of-ink data DQ1, DQ2 and DQ2 representing the quantities $q_C$, $q_M$ and $q_Y$ stored in the memories 62a, 62b and 62c at the addresses designated by the currently supplied light-intensity signals $G_R$, $G_G$ and $G_B$ are supplied from the input/output terminals of the memories directly to the weighted-parameter summing circuit 66. When the bus control signal BC is of the high level, furthermore, high-impedance states are established in the tri-state gate circuits 78a, 78b and 78c so that the memories 62a, 62b and 62c are further disconnected from the address bus 68 and are thus isolated from the address signal AD from the microprocessor 58. Under these conditions, the bus control signal BC of the high level is passed through the inverter 80 to the output enable terminals $\overline{OE}$ of the memories 62a, 62b and 62c and to the control terminals of the tri-state gate circuits 76a, 76b and 76c. The memories 62a, 62b and 62c are thus allowed to have their address input terminals connected to the shading generator circuit 30 and are enabled to output the quantity-of-ink data DQ1, DQ2 and DQ3 from the input/output terminals thereof.

In the presence of the bus control signal BC of a low level output from the microprocessor 58, the memories 62a, 62b and 62c are connected to the microprocessor 58 through the tri-state gate circuits 84a, 84b and 84c, respectively. Under these conditions, the quantity-of-ink data DI fetched from the read-only memory 72 are passed through the data bus 70 and tri-state gate circuits 84a, 84b and 84c to the memories 62a, 62b and 62c and are stored at the addresses designated by the address signals AD supplied from the microprocessor 58. The bus control signal BC being of the low level, the memories 62a, 62b and 62c are allowed to have their address input terminals connected to the adress bus 68 through the tri-state gate circuits 78a, 78b and 78c with their output enable terminals $\overline{OE}$ isolated from the bus control signal BC from the microprocessor 58. The data DI loaded into the memories 62a, 62b and 62c will be released from the input/output terminals of the memories to the summing circuit 66 but there will arise no problems if appropriate arrangement is made to disable the print head under these conditions.

While the fixed parameters $a_{00}$ to $a_{22}$ used in the masking circuit 56 of the colored image reading apparatus embodying the present invention have been assumed to have positive values, there may be cases where the parameters assume negative values. In consideration of this, it is preferable that the weighted-parameter summing circuit 66 used in the masking circuit embodying the present invention be designed to be of the type capable of summing up both positive and negative input signals. In this instance, the data representing each of the negative-value parameters to be stored into the memories 62a, 62b and 62c may be formulated to have its most significant bit (MSB) assigned to a sign bit followed by a sequence of bits representing a complement of the negative value. Alternatively, an appropriate sign control circuit may be provided between the summing circuit 66 and the memories 62a, 62b and 62c to control the summing circuit 66 to perform summing operation in a negative mode for an input signal representing a negative value.

What is claimed is:

1. A colored image reading apparatus for use in reproducing multi-color images with toning materials of different colors and having different properties, comprising:

(a) a color image sensor to be driven for movement with respect to a document to read images on the document and produce light-intensity signals respectively variable with the red, green and blue components of said images, (b) masking means for converting said light-intensity signals into data dictated by the properties of the toning materials with which said images are to be reproduced, said masking means comprising random access memory means for sequentially storing data respectively corresponding to various values of said intensity signals and summing means for summing signals representative of the data output from said memory means, (c) said random access memory means having stored sequentially therein quantity of ink data for each of at least three toning material colors, said quantity of ink data being logarithmic values of the multiplication of values respectively corresponding to said light-intensity signals and predetermined parameters specific to the properties of said toning materials, the memory means being operative to sequentially output to said summing means the quantity of ink data for each of said at least three toning material colors, and (d) output means for outputting signals representing the data produced by said masking means for reproducing said multi-color images.

2. A colored image reading apparatus as set forth in claim 1, in which said memory means comprises three memories for storing data which correspond to said red, green and blue components of said images.

3. A colored image reading apparatus as set forth in claim 2, in which said masking means further comprises means operative to supply to said memory address signals provided by said light-intensity signals and means operative to fetch data from said memory means at the addresses respectively designated by said address signals.

4. A colored image reading apparatus for use in reproducing multi-color images with toning materials of at least three different colors and having different properties, comprising:

(a) A color image sensor movable with respect to a document to read images on the document and produce light-intensity signals respectively variable with the red, green and blue components of said images, (b) data supply means including read only memory means for retaining data for converting said light-intensity signals into at least three color density signals corresponding to said at least three different colors of said toning materials, respectively, and (c) data converting means responsive to said light-intensity signals for sequentially producing said color density signals, said color density signals being respectively representative of the quantity of each color of toning material required for reproducing said images, said data converting means comprising random-access memory means into which said data retained in said data supply means is loaded in a sequential manner for each of said at least three different colors so as to sequentially produce each of said color density signals.

5. A colored image reading apparatus as set forth in claim 4, in which said memory means comprises three memories for storing data which correspond to said red, green and blue components of said images and summing means for summing signals representative of the data fetched from said memory means.

6. A colored image reading apparatus set forth in claim 4, in which said data supply means is exchangeable with another one retaining a modified version of the data retained in said data supply means.

7. A colored image reading apparatus as set forth in claim 4, in which said data supply means is one of a plurality of data supply means which have retained therein different versions of data and in which any one of said plurality of data supply means can be selected for converting said light-intensity signals into said color density signals in respect of said different colors of said toning materials, respectively.

8. A colored image reading apparatus as set forth in claim 4, in which said data converting means further comprises switching means for connecting said memory means selectively to said data supply means or said color image sensor.

9. A colored image reading apparatus as set forth in claim 8, in which the light-intensity signals output from said color image sensor are supplied as address signals to said memory means, said data converting means further comprising means operative to fetch data from said memory means at the addresses respectively designated by said address signals.

10. A colored image reading apparatus for use in reproducing multi-color images with toning materials of different colors and having different properties, comprising:

a) a color image sensor for reading images on a document and produce light-intensity signals respectively variable with the red, green and blue components of said images, b) scanning means for driving one of said color image sensor and said document for forward and backward movements with respect to the other for enabling said color image sensor to optically scan the images on said document during forward movement of the color image sensor, c) data supply means retaining therein data in accordance with which said light-intensity signals are to be converted into color density signals in respect of said different colors of said toning materials, respectively, d) data converting means responsive to said light-sensitive signals for producing signals respectively representative of the quantities in which said images are to be reproduced by said toning materials, said data converting means comprising random-access memory means into which the data retained in said data supply means and exclusively relating to the images which are about to be reproduced are to be loaded, and e) control means operative, during the backward movement of said color image sensor subsequent to termination of the forward movement of said color image sensor for the scanning of said images for reproducing the images with one of said toning materials, to control said data converting means to load into said memory means the data retained in said data supply means and exclusively relating to the images which are about to be reproduced with another toning material.

11. A colored image reading apparatus as set forth in claim 10, in which said memory means comprises three memories for storing data which correspond to said red, green and blue components of said images and summing means for summing signals representative of the data fetched from said memory means.

12. A colored image reading apparatus as set forth in claim 10, in which said data converting means further comprises switching means for connecting said memory means selectively to said data supply means or said color image sensor, said control means being operative to control the timings at which said switching means connects said memory means to said data supply means or said color image sensor.

13. A colored image reading apparatus as set forth in claim 10, in which the light-intensity signals output from said color image sensor are supplied as address signals to said memory means, said data converting means further comprising means operative to fetch data from said memory means at the addresses respectively designated by said address signals.

* * * * *